Patent Document

3,413,467
ATMOSPHERIC NITROGEN FLUORESCENCE DETECTION APPARATUS
Donald R. Westervelt, Los Alamos, N. Mex., assignor to the United States of America as represented by the United States Atomic Energy Commission
Filed Dec. 9, 1965, Ser. No. 512,831
6 Claims. (Cl. 250—71.5)

ABSTRACT OF THE DISCLOSURE

A fluorescence detection apparatus for the detection of nuclear explosions in space comprising a wide angle optical system, a wavelength selector for selection of a strong nitrogen molecular emission, a photo cell for transforming said emission into an electrical signal and amplification of said signal.

---

The invention described herein was made in the course of, or under, a contract with the U.S. Atomic Energy Commission.

The present invention relates to fluorescence detection apparatus and, more particularly, to an apparatus which may detect the occurrence of a nuclear explosion in space.

A large fraction of the energy generated in nuclear explosions is released in the form of thermal emission in the soft X-ray region (0.1–100 angstroms). At sea level the surrounding air absorbs this energy within a short distance whereas, at high altitudes, local absorption is greatly modified or eliminated. Consequently, the X-rays which carry the bulk of the total energy release are free to travel unimpeded until they interact with an absorbing material. It has been found that the greatest energy deposition (presuming a 1-kv. surface temperature for an extra-atmospheric explosion having thermal X-ray yield of 1 kiloton) is at about 80 kilometers where the air density is $2 \times 10^{-8}$ g./cc. or $7 \times 10^{-6}$ of sea level density. The X-rays are absorbed predominantly by the photoelectric process, releasing photoelectrons having energies equal to those of the absorbed photons less the K-electron binding energy. The ejected electrons, which at the altitudes in question are stopped in a few microseconds, excite, together with their secondary electrons, the various components of the air, resulting in emission of visible light at characteristic discrete wavelengths much as in the case of a laboratory discharge at low gas density.

At low altitudes it is found that the fluorescence surrounding the explosion consists mainly of emission by nitrogen in the $N_2$ Second Positive (2P) system and in the $N_2^+$ First Negative (1 N) system, with approximately equal intensity in each system. At higher altitudes excitation of the triplet upper level of the $N_2(2P)$ system, which involves a change in multiplicity (the ground state of $N_2$ is a singlet), is suppressed relative to excitation of the $N_2^+$ (1 N) system; it is principally emission in the latter system therefore that is significant for the purpose of detecting X-ray induced fluorescence.

Although the energy deposition occurs in the ionosphere over a region many kilometers thick, the incident X-ray flux and the light emitted travel downward with the same velocity. Thus the time smear in the light signal along the direct line of sight to the burst depends only on the X-ray source lifetime (typically less than a microsecond) and on the electron stopping time. Since these times are short, the effective deposition rate is high. What is seen from the ground is a bright flash in the direct line of sight to the burst, which decays quickly but is replaced by a rapidly expanding annular ring of light. A system viewing the entire sky sees a pulse of light that rises in about a microsecond and falls to half intensity in one-fourth millisecond, at which time the expanding ring, for a zenith explosion, has nearly reached the horizon.

Efficiency (defined as energy emitted in the $\lambda$ 3914 A. band divided by the energy deposited) has been found to amount to about $10^{-2}$ for emission in the $\lambda$ 3914 A. (0,0) band of the $N_2^+$ (1 N) system.

Calculating now the energy deposition from known nominal source characteristics, then the light output with the above efficiency number, and finally integrating over time and space, one obtains a maximum flux on the ground in the $\lambda$ 3914 A. band of about $2.5 \times 10^{-8}$ watts/centimeter$^2$, from 1 kiloton at $10^5$ kilometers when the source is within 50 degrees of zenith. It is this light flux that must be detected in the presence of natural backgrounds, principally the light of the daytime sky itself.

According to the present invention this light flux is transmitted through a collimating lens and an interference filter. This filter screens out light of wavelengths which are not characteristic of air fluorescence. The signal from photomultipliers is then amplified and sevomechanism means maintain the noise in this signal at a constant level by controlling, through a series vacuum tube regulator, the high voltage applied to the photomultiplier detector. A level discriminator responsive to signals that exceed a predetermined threshold level then produces an output trigger pulse which causes the signals to be recorded. Signals transmitted to the level discriminator input may be passed through a bandpass or matched filter whose transmission characteristics are determined from known charactertistics of the signal to be detected, in such a way as to minimize statistical fluctuations by excluding frequencies outside the range of those known to characterize the signal. A multiplicity of detector channels are utilized so that a coincidence circuit may be used which is capable of responding only to trigger signals from two or more detectors that occur within a predetermined coincidence gate, the gate length being determined from known signal characteristics. Some of the detector channels utilize interference filters which transmit wavelengths characteristic of lightning flashes but absent in air fluorescence. An anticoincidence circuit is then used which is capable of rejecting signals of comparable intensity in both the "nitrogen" channels and the "background" channels. Signals which indicate a nuclear explosion can then be accepted and recorded in any of various known ways. In designing the system, the range capability in full daylight was taken as a guide; a target figure was $10^5 \sqrt{Y_x}$ kilometers ($Y_x$ is the thermal X-ray yield in kilotons.) The night range would then be better than $10^8 \sqrt{Y_x}$ kilometers.

Accordingly, an object of the present invention is to provide an apparatus which will detect nuclear explosions in space in the presence of natural background signals, with adequate sensitivity, low false alarm rate, and resistance to cloud effects.

The manner in which this objective is obtained will become apparent from the following description with reference to the drawings which are made a part of this specification.

Figure 1:
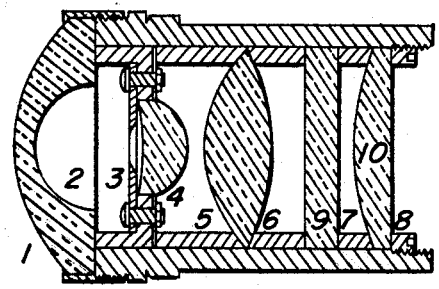
FIGURE 1 is a cross section of one form of lens which may be utilized in the present invention.

The described device utilizes a single detector to view a 160° or 5.2 steradian field of view. The optical system of FIG. 1 is 2 in. in diameter having a focal length of 0.43 in. and a numerical aperture of f/2.8. The lenses in this system are defined as follows:

TABLE I.—(WIDE ANGLE CONDENSING LENS)

| Surface | Radius Positive for Convex, Radius Negative for Concave | Axial Thickness | Trim Diameter |
| --- | --- | --- | --- |
| 1 | 1.300±.010 | } 0.150±.010 | 1.875{+.000/−.002} |
| 2 | 0.426±.005 | | |
| 3 | −2.000±.015 | } 0.300±.015 | 0.3437{+.000/−.002} |
| 4 | 0.409±.005 | | |
| 5 | 1.000±.010 | } 0.500±.015 | 1.400{+.000/−.002} |
| 6 | 1.546±.010 | } 0.500±.015 | |
| 7 | 1.924±.010 | } 0.300±.015 | 1.400{+.000/−.002} |
| 8 | ∞ | | |

NOTE.—Lens material=Crown glass, Borosilicate, nh. 1.530.

The lenses employing surfaces 1–6 gather light from a large field (5.2 steradians) and collimate the light flux through interference filter 9. Interference filter 9 is nominally a 3914 A. filter having 24 A. bandpass and approximately 50% transmission. Field lens 10 is interposed between interference filter 9 and photomultiplier 11. This field lens collimates the central rays from all angles in the plane of an interference filter; the latter is used to minimize acceptance of light of wavelengths other than that of the principal $N_2^+$ band (3914 A.).

Figure 2:
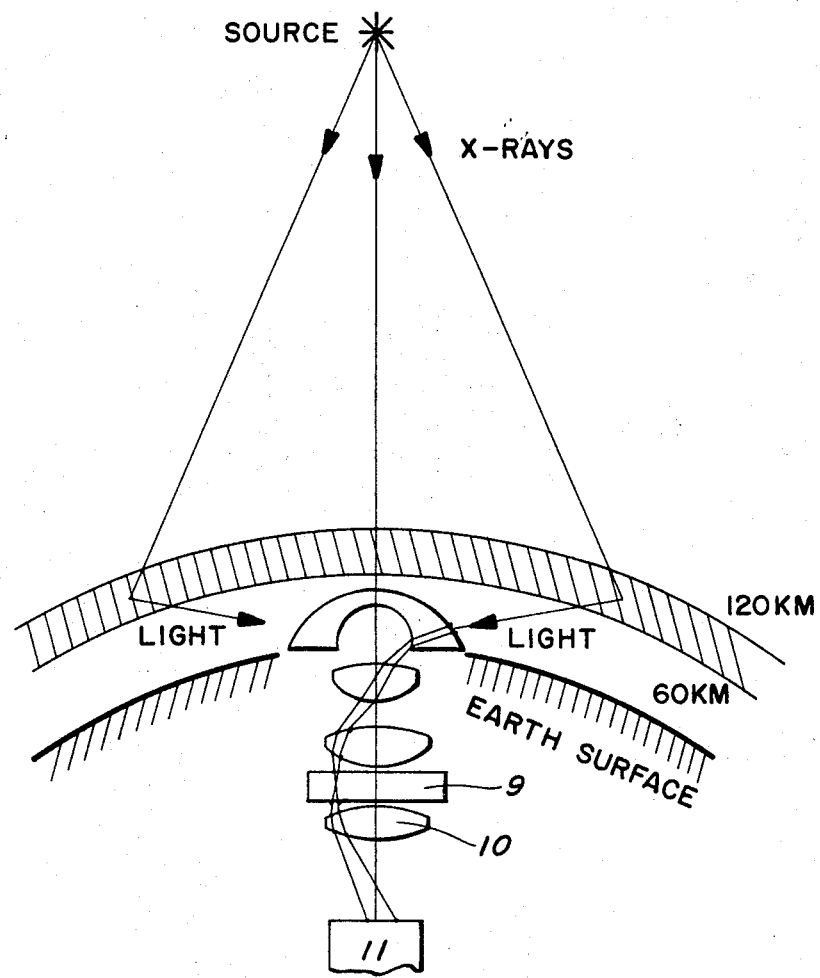
FIGURE 2 is a schematic diagram of the light collection scheme (not to scale).

FIGURE 2 illustrates the light collection scheme (not to scale) utilized in the present device and is self-explanatory. It will be noted that light rays over a very wide angle are collimated through interference filter 9 and onto the photocathode of the photomultiplier 11. Instead of using a wide angle lens, an array of detectors could be used which view only a small fraction of the sky with each detector channel. This array gives directional information whereas the wide angle system does not, but it is much more expensive and is more susceptible to clouds.

A device useful in detecting nuclear explosions in space requires a constant and adjustable false-alarm rate. This is achieved by maintaining the shot noise at a constant level through regulation of the photomultiplier high voltage; the output noise is detected and fed back to the high-voltage regulation circuit. A level discriminator then responds to signals exceeding a preset level; the electrical bandpass of the channel to the discriminator is made as small as possible consistent with the known signal characteristics (a small improvement can be made by using a matched filter). To minimize false alarms further, a double or triple coincidence is required between similar channels; the coincidence gate may be, for example, 100 microseconds, requiring storage of the signals for that length of time. When an appropriate coincidence occurs, the stored signals are displayed (through a wideband amplifier) on oscilloscopes and automatically photographed. The world-time clock, which has 100-microsecond resolution in anticipation of VLF time signals, records the time of the event on printed tape.

Most natural backgrounds, other than shot noise, are minimal. Only lightning strokes frequently duplicate the time history expected from a nuclear event. Fortunately lightning has additional optical characteristics such as emission of continuum radiation from the strongly heated air which are normally not present in high altitude air fluorescence. In order to eliminate false alarms, a second set of detectors is therefore provided. Instead of responding to molecular air fluorescence, these detectors are centered on a broad band of continuum lightning emission. A trigger inhibitor has then been designed that senses the ratio of signals at the two bands and effectively prevents a system trigger for a large fraction of lightning strokes. In order to increase the reliability of false alarm recognition still further, current studies may lead to the utilization of the strongest optical characteristics of lightning, namely the emission of atomic radiation, for entirely foolproof discrimination.

In practical operation the thresholds are set at about five times root mean square noise, and a 2 out of 3 coincidence mode is used. The statistical trigger rate under these conditions is entirely acceptable, and the few random noise signals recorded are easily identified. Anode currents of 20 to 40 microamperes are obtained in full daylight at operating voltages between 750 and 500 volts, with adequate tube life in field operation. The system has been tested successfully against high-altitude events, although practical implementation with available components (interference filters, particularly) has reduced slightly the range obtained from the target value. Since each detector location has an effective field of view of more than $\pi$ steradians, only a relatively small number of locations are required for effective coverage of all of outer space (within the system range).

Figure 3:
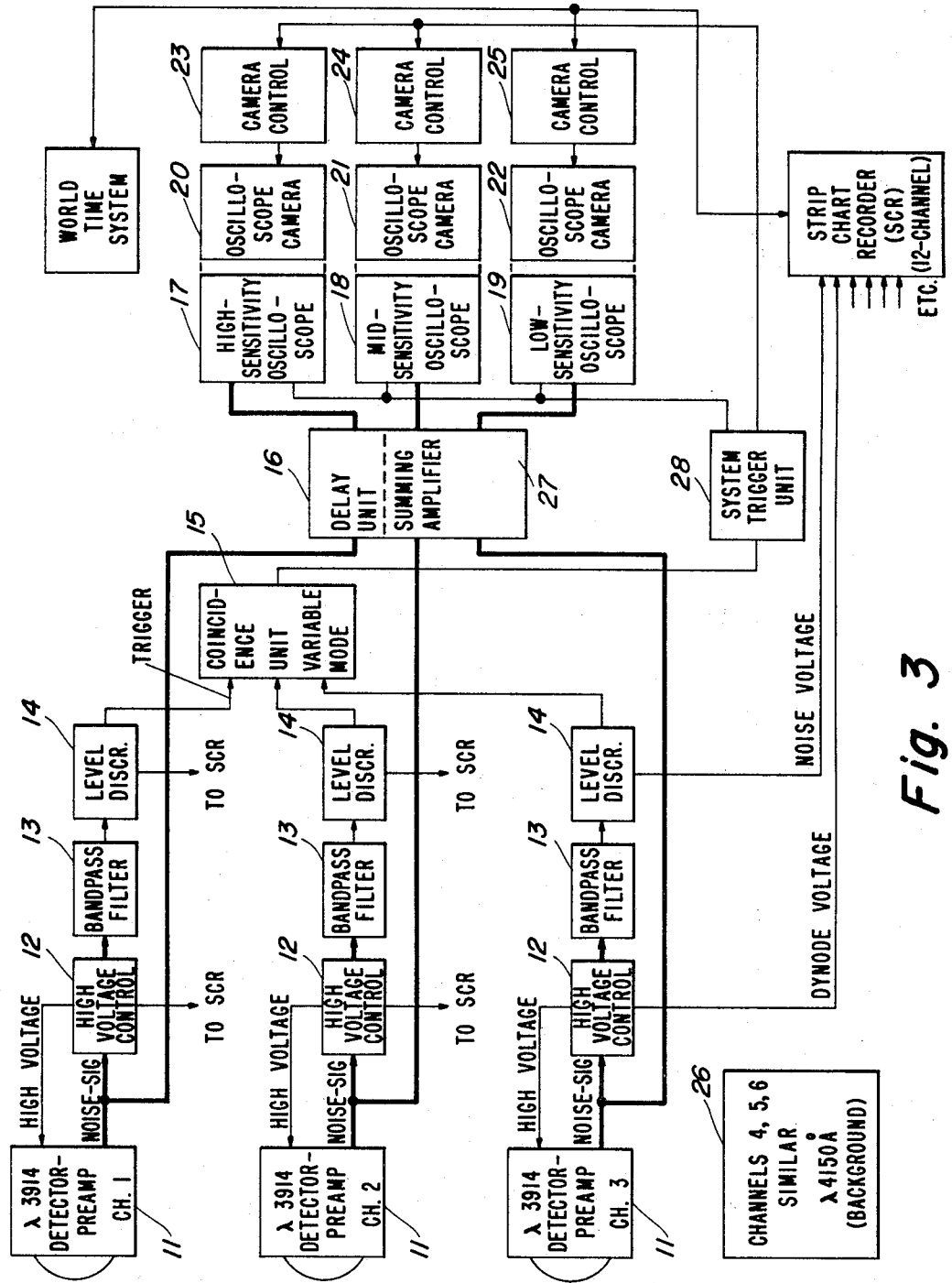
FIGURE 3 is a block diagram of a complete detection system.

In one specific form of the invention, represented generally by FIG. 3, three identical channels are represented. Heavy lines between boxes indicate video signals whereas narrow lines represent narrow-band signals. Detector-preamplifier 11 comprises a photomultiplier (e.g., RCA 6342 or 2020 2 in. photomultiplier, the high voltage being regulated by high voltage control 12) and a preamplifier (e.g., gain of 10 to 12 and 200 kc. bandpass). The high voltage control may be a Type 6842 series high voltage control tube with full wave rectification of the noise components in the output of the preamplifier. The control operates on broad-band noise. The bandpass filter 13 may have a typical low frequency cutoff of 100 c.p.s. and high frequency cutoff of 2000 c.p.s. Level discriminator 14 is a Schmidt discriminator followed by a variable-width, one-shot multivibrator. The width of the output pulse determines the coincidence gate, nominally 100 microseconds. The Schmidt level is adjustable over a 10:1 range to obtain the desired single channel trigger rate (nominally operated at 5 times RMS noise).

In coincidence unit 15 the diode logic at the input selects the desired combination, the coincidence gate being determined by the length of the level discriminator output pulse. The combined input pulses trigger a one-shot multivibrator. The delay unit 16 permits storage of signals for the length of the coincidence gate. Typical parameters are 200 kc. bandpass and a 100–200 $\mu$sec. delay time. The summing amplifier, designated at 27, has a 200 kc. bandpass and adds the individual channel output signals for display on standard commercial oscilloscopes 17, 18 and 19. These units are selected so that the sensitivities are staggered to cover the full dynamic range of the system. Cameras 20, 21 and 22 are 35 mm. strip loaded with automatic film advance, the advance being accomplished by camera controls 23, 24 and 25 on receipt of the system trigger from 28. Channels 4, 5 and 6, represented at 26, are similar to channels 1, 2 and 3 except that the channels employ a 4150 A. filter. System trigger unit 28 includes a trigger inhibitor which will not produce a trigger if two coinciding signals are received.

What is claimed is:

1. An air fluorescence detector comprising a narrow bandpass optical interference filter, said filter being chosen to transmit a wavelength associated with atmospheric nitrogen fluorescence, a second optical interference filter, said second filter being chosen to transmit wavelengths absent in air fluorescence but present in sources of natural background, a multiplicity of detectors, the output of said detectors being amplified, servomechanism means which detect the noise in the amplified detector signals and maintain the noise at a constant level by controlling the high voltage to the detectors, level discriminator means, said level discriminator means being responsive to signals that exceed a predetermined threshold level, coincidence circuit means capable of responding only to trigger signals from at least two detectors that occur within a predetermined coincidence gate, and anticoincidence circuit means capable of rejecting signals of comparable intensity from both types of interference filters.

2. An air fluorescence detector as in claim 1 wherein collimating lenses are placed in front of the interference filters.

3. An air fluorescence detector as in claim 1 wherein the second optical interference filter is chosen to transmit wavelengths characteristic of lightning but absent in air fluorescence.

4. An air fluorescence detector as in claim 1 wherein the detectors are photomultipliers.

5. An air fluorescence detector as in claim 1 wherein the servomechanism means include a series vacuum tube regulator.

6. An air fluorescence detector as in claim 1 wherein a bandpass filter is placed between the detector circuit and level discriminator in order to reduce electrical bandpass in the signal-sensing circuit to the minimum permitted by known signal characteristics.

References Cited
UNITED STATES PATENTS

| | | | |
|---|---|---|---|
| 2,950,391 | 8/1960 | Brumley et al. | 250—71.5 |
| 3,302,023 | 1/1967 | Schachter | 250—71 |
| 3,308,296 | 3/1967 | Cowan et al. | 250—71.5 |
| 3,320,419 | 5/1967 | Thomas et al. | 250—71.5 |
| 3,327,116 | 6/1967 | Loveday | 250—71.5 |

RALPH G. NILSON, *Primary Examiner.*

S. ELBAUM, *Assistant Examiner.*